United States Patent
Hu et al.

(10) Patent No.: US 11,824,939 B1
(45) Date of Patent: Nov. 21, 2023

(54) INTERNET-BASED REMOTE INTERACTIVE SYSTEM FOR SEX TOYS

(71) Applicants: Junhao Hu, Shenzhen (CN); Min Liao, Shenzhen (CN)

(72) Inventors: Junhao Hu, Shenzhen (CN); Min Liao, Shenzhen (CN)

( * ) Notice: Subject to any disclaimer, the term of this patent is extended or adjusted under 35 U.S.C. 154(b) by 0 days.

(21) Appl. No.: 17/955,608

(22) Filed: Sep. 29, 2022

(51) Int. Cl.
*H04L 67/125* (2022.01)
*G08C 17/02* (2006.01)
*A61H 19/00* (2006.01)

(52) U.S. Cl.
CPC ............ *H04L 67/125* (2013.01); *G08C 17/02* (2013.01); *A61H 19/50* (2013.01); *G08C 2201/30* (2013.01)

(58) Field of Classification Search
CPC ... H04L 67/125; G08C 17/02; G08C 2201/30; A61H 19/50
USPC ........................................................ 709/217
See application file for complete search history.

(56) References Cited

U.S. PATENT DOCUMENTS

| | | | | |
|---|---|---|---|---|
| 2015/0328082 | A1* | 11/2015 | Jiang | A61H 23/02 600/38 |
| 2019/0175441 | A1* | 6/2019 | Urbani | A61H 19/32 |
| 2021/0209934 | A1* | 7/2021 | Siles | H04N 21/4788 |
| 2021/0341992 | A1* | 11/2021 | Cambridge | A61H 19/44 |
| 2023/0093192 | A1* | 3/2023 | Liu | A63F 13/80 600/38 |

* cited by examiner

*Primary Examiner* — Frantz B Jean
(74) *Attorney, Agent, or Firm* — Jose Cherson Weissbrot

(57) ABSTRACT

This invention discloses an internet-based remote interactive system for sex toys, comprising: an APP server used for storing data of different users and handling different user data requests; a sex toy that can receive signals, in which, the sex toy is configured to produce actions based on the received signals; a wireless mobile device with an APP for sending signals to the sex toy, in which, the APP can send signals to the sex toy to control the sex toy action based on the user-operated virtual control panel, and can also send signals to the sex toy to control the sex toy action based on the control commands received from the APP server.

6 Claims, 6 Drawing Sheets

INTERNET-BASED REMOTE INTERACTIVE SYSTEM FOR SEX TOYS

FIELD OF THE INVENTION

This invention relates to the technical field of internet remote control, and more particularly to an internet-based remote interactive system for sex toys.

BACKGROUND OF THE INVENTION

Generally, information exchange allows a plurality of users in the internet to interact simultaneously. However, this interaction can only be limited to the audio and video interaction, which cannot produce interconnection with items in the real world.

Adult content refers to the entertainment provided to adults. However, if the entertainment is only limited to audios and videos, it will become boring after a long period of time. Therefore, we want to design a system to realize the building of interaction between the users in different positions with sex toys in the real-world to facilitate happiness of different users and attract them.

SUMMARY OF THE INVENTION

To solve the disadvantages of the prior art, this invention aims to provide an internet-based remote interactive system for sex toys to realize the control over sex toys through the internet, which adds interaction between users and creates a new way of sex interaction experience.

To achieve the above object, the present invention provides the following technical scheme:

An internet-based remote interactive system for sex toys is provided, comprising a server used for storing data of different users and handling different user data requests; a sex toy that can receive signals, in which, the sex toy is configured to produce actions based on the received signals; a wireless mobile device with an APP for sending signals to the sex toy, in which, the APP can send signals to the sex toy to control the sex toy action based on the control commands from the server; when user-to-user interaction exists, the system also comprises a user A, in which, the user A has an operable sex toy that can be configured to receive signals and a wireless mobile device A connected to the sex toy in the same internet; the user A is connected to the internet and then is connected to the server to obtain data through the wireless mobile device; and a user B, in which, the user B has a wireless mobile device B that can be connected to the server through the internet; the user B can send control commands to the server through the control link shared by the user A; after receiving the control commands, the sex toy produces the actions corresponding to the control commands, and the action implementing object is the user A.

It should be noted that the sex toy is connected to the APP through the Bluetooth or WiFi. The sex toy produces the corresponding actions by receiving the control commands from the APP, and the APP sends the control commands to the sex toy based on the control commands received from the server.

It should be noted that the user B can open the control link shared by the user A through the web browser, in which, the user A can obtain a remote control link from the server through the APP, and send the link to the user B through third-party communication software. After the user B receives the remote control link and opens the corresponding URL through the web browser, the URL will generate a virtual control panel; the user B sends control commands to the server by operating the virtual control panel; the server relays the control commands to the APP of the user A; the APP sends the control commands to the sex toy based on the control commands received from the server; and the sex toy produces the corresponding actions.

It should be noted that the APP comprises a game lobby, in which, the subprogram allows the user to create a game room or enter an existing game room; the user creating the game room is called a homeowner, and other users in the game room are teammate.

It should be noted that the game room can be public or private; when the game room is public, any user in the game lobby can enter the room; when the game room is private, if a user in the game lobby wants to enter the game room, the user needs to send a request to the homeowner and can only enter the room after obtaining the consent of the homeowner; and the homeowner can send a game invitation to a designated user in the game lobby; after the user agrees to join, the user will automatically enter the homeowner room.

It should be noted that the homeowner can send control commands to an APP-connected sex toy and control the sex toy to produce the corresponding actions; at the same time, the APP relays the control commands to the APPs of other teammates in the room though the server; after receiving the control commands relayed by the server, the teammate APPs send control commands to the corresponding APP-connected sex toys and control the toys to produce the corresponding actions.

It should be noted that the homeowner can appoint one captain among teammates as the controller; the captain can replace the homeowner to control the sex toys of all members in the room including the homeowner to produce the corresponding actions; the homeowner can cancel the captain appointment at any time or re-appoint a captain; the captain can also hand over the control right to another teammate, and the teammate that takes over the control right will become the new captain.

The technical scheme of the invention is different from the prior art, and the novelty and creativity of the invention is obvious.

BRIEF DESCRIPTION OF THE DRAWINGS

It should be noted that FIG. 1, FIG. 3, and FIG. 6 describe a playing method of sex toys through this system, in which, the user A shares the remote control link to the user B, and the user B sends control commands to the toy of the user A through the virtual control panel generated by the link to control the toy of the user A to produce actions; FIG. 2, FIG. 4, FIG. 5, and FIG. 7 describe another playing method of sex toys through this system, in which, the user creates a game room using the system APP and other users enter the game room for mutual interaction.

DETAILED DESCRIPTION OF THE INVENTION

The present disclosure will be explained in details with reference to the accompanying drawings. It should be noted that the embodiments below provide detailed implementation methods and specific operation process based on this technical scheme. However, the protection scope of this invention is not limited to these embodiments.

Figure 1:
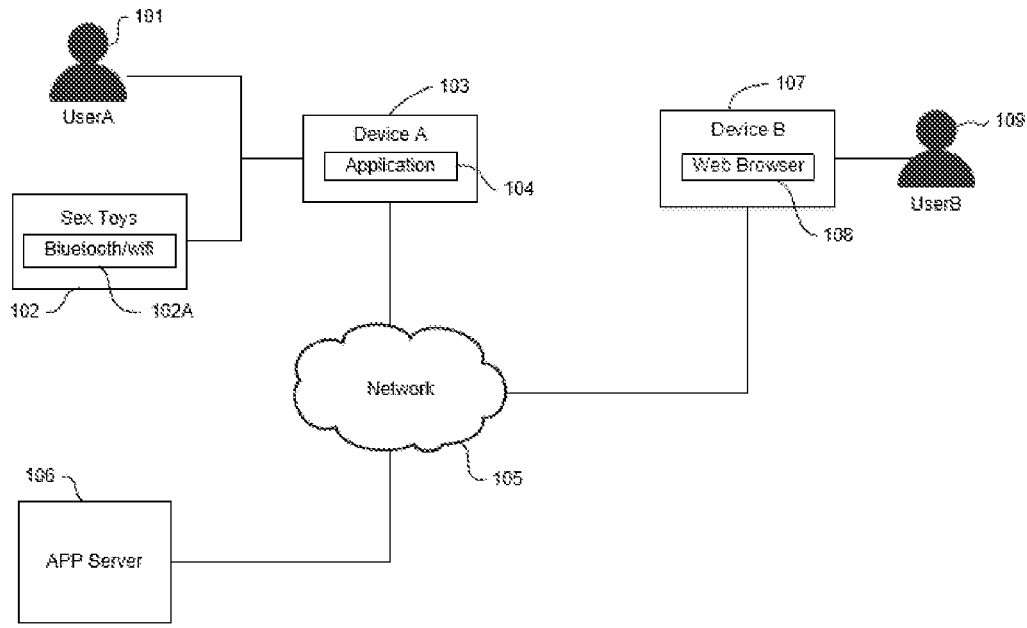
FIG. 1 is the structure diagram of the system with sex toys controlled by the remote control link.

FIG. 1 shows a technical scheme of the present invention. The system of this inventions comprises: a user A 101, in which, the user A 101 has an operable sex toy 102 that can be configured to receive signals and a wireless mobile device 103 connected to the sex toy in the same internet; the same network refers to Bluetooth/WiFi connection 102A. The wireless mobile device 103 of this invention is provided with an APP 104 for connecting sex toys. This system also comprises a server 106 for storing data of different users and handling different user data requests; a user A 101 that is connected to the internet 105 and then is connected to the server 106 to obtain data through the wireless mobile device 103; a user B 109, in which the user B 109 has a wireless mobile device 107 that can be connected to the server 106 through the internet 105; the user B 109 can send control commands to the server 106 through the control link shared by the user A 101; after receiving the control commands, the sex toy 102 produces the actions corresponding to the control commands, and the action implementing object is the user A 101. It should be note that the user B 109 can run the web browser 108 program in the wireless mobile device 107 to open the control link shared by the user A 101.

Figure 2:
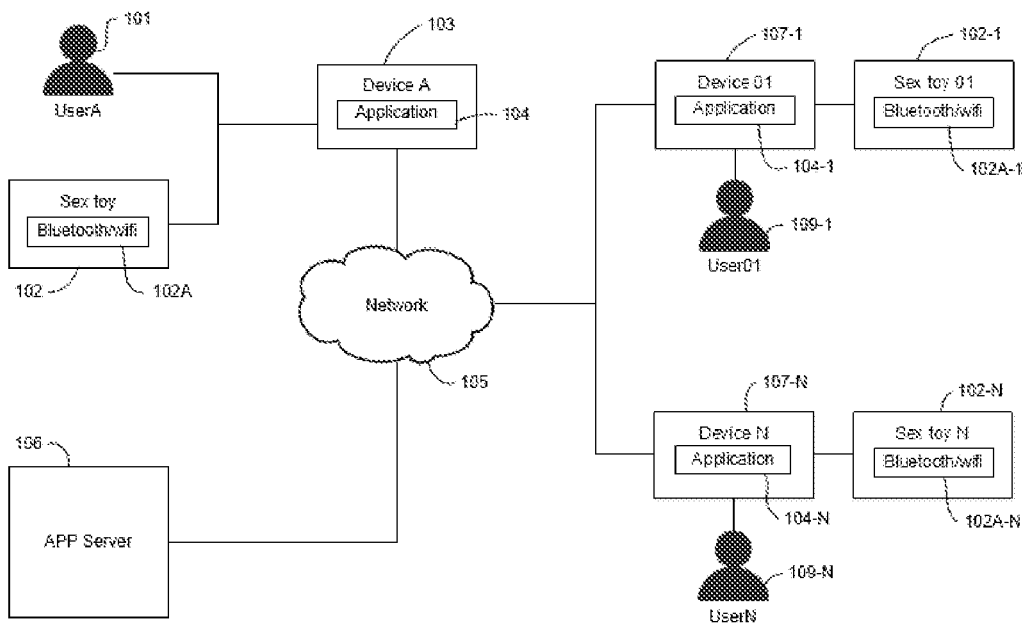
FIG. 2 is the structure diagram of the mutually-controlled interaction system of sex toys between a plurality of users by creating a game room through the APP.

FIG. 2 shows another technical scheme of the present invention. It should be noted that in this embodiment, the wireless mobile devices between different users are installed with the APP of this invention system. Specifically, the system of this present invention comprises: a user A 101, in which, the user A 101 has an operable sex toy 102 that can be configured to receive signals and a wireless mobile device A 103 connected to the sex toy in the same internet; the same network refers to Bluetooth/WiFi connection 102A. This system also comprises a server 106 for storing data of different users and handling different user data requests; a user A 101 that is connected to the internet 105 and then is connected to the server 106 to obtain data through the wireless mobile device 103; and users 109-1 to 109N (referring to a plurality of users), in which, the users 109-1 to 109N have wireless mobile devices 104-1 to 104-N (referring to that different users have one set of wireless mobile device) that are connected to the server 106 through the internet 105; at the same time, users 109-1 to 109N have sex toys 102-1 to 102-N (referring to that different users have one set of sex toy that is connected to the wireless mobile device) that are connected to wireless mobile devices 104-1 to 104-N; the user 101 can send control commands to the toy 102 through the APP 104 to control the action of the toy 102, and the action implementing object is the user 101; simultaneously, the APP 104 relays the control commends to the APPs 104-1 to 104-N of the users 109-1 to 109-N through the server 106, and the APPs 104-1 to 104-N send the received control commends to the toys 102-1 to 102-N respectively; after receiving the control commands, the toys 102-1 to 102-N produce the actions corresponding to the control commands, and the implementing objects of the actions are the users 109-1 to 109-N; the user 101 can appoint any user from the users 109-1 to 109-N as a captain, and the user being appointed as the captain can execute the same control operation as the user 101, and the toys of other users including the user 101 will synchronize with the toy of the captain and produce the same action.

Figure 3:
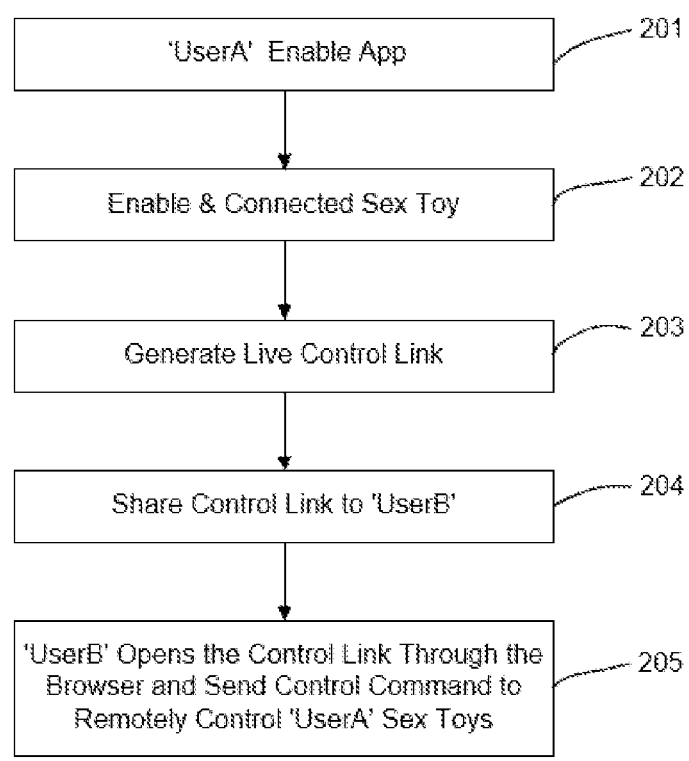
FIG. 3 is the flow diagram of the system with sex toy controlled by the remote control link.

FIG. 3 illustrates the implementation method of one of the technical scheme of the present invention in a simple and direct manner;

S201 The user A enables the APP in the wireless mobile device A that controls the sex toys;

S202 Enable the sex toy and connect the APP to the sex toy in a wireless manner in the same network;

S203 The APP obtains a live remote control link from the server;

S204 Share the user B with the sex toy control link;

S205 The user B receives the sex toy control link from the wireless mobile device B and uses the web browser program to open the sex toy link for the remote control of the sex toy of the user A.

Figure 4:
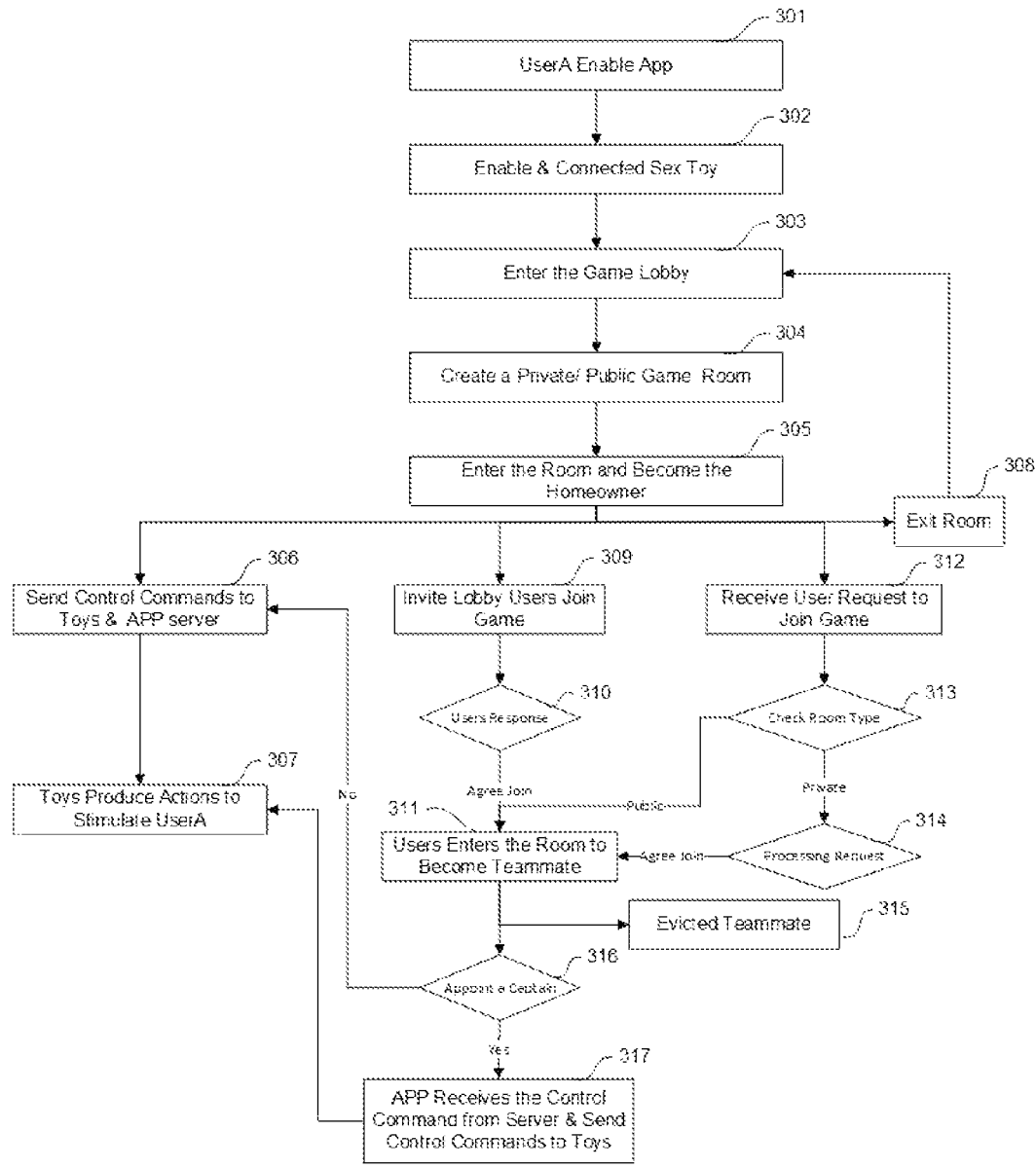
FIG. 4 is the flow diagram of the homeowner in the mutually-controlled interaction system of sex toys between a plurality of users by creating a game room through the APP.

FIG. 4 shows another technical scheme of the present invention, i.e., creating game room mode. Similarly, the system of this present invention comprises: a user A, in which, the user A has an operable sex toy that can be configured to receive signals and a wireless mobile device A connected to the sex toy in the same internet; the same network refers to Bluetooth/WiFi connection. The wireless mobile device A of this invention is provided with an APP for connecting sex toys. The system also comprises a server used for storing data of different users and handling different user data requests; and a user A that is connected to the internet and then is connected to the server to obtain data through the wireless mobile device. Based on this premise, the operation method in game room mode includes the following steps:

S301 The user A enables the APP in the wireless mobile device A that controls the sex toys;

S302 Enable the sex toy and connect the APP to the sex toy in a wireless manner in the same network;

S303 The user A enters the game lobby through the APP;

S304 The user A creates a public game room or a private game room based on the game lobby function;

S305 The user A enters a public game room or a private game room and becomes the homeowner;

S309 The homeowner sends an invitation to any user in the game lobby to enter the game room;

S310 The system identifies the feedback of any invited user. If the invited user agrees to join the game room, then the invited user will enter the game room and become a teammate;

S311 The user successfully enters the game room and becomes the teammate;

It should be noted that the method also includes the following steps:

S312 The homeowner can receive a request to enter the game room from any user;

S313 The system will automatically identify the game room property. If the game room property is public, any user can directly enter the game room and become the teammate;

S314 If the game room property is private, any user needs to obtain the consent from the homeowner to enter the game room and become the teammate;

S306 The homeowner operates the APP virtual control panel mounted on the wireless device and sends control commands to the toy; synchronously, the APP relays the control commands to the APPs of all teammates in the room;

S307 The toy of the homeowner produces the corresponding actions to stimulate the homeowner based on the received control commands.

It should be noted that the method also includes the following steps:

S316 The homeowner appoints any user that has joined the game room as the captain, and the user being appointed as the captain will replace the homeowner and become the controller to obtain the control right over toys;

S317 The APP of the homeowner receives the control commands from the server and relays the control commands to the toy of the homeowner;

S315 The homeowner can evict any user that has entered the game room out of the room;

S308 If the homeowner exits the room and ends the game, the room will be dismissed, and all users in the room will return to the game lobby;

It should be noted that the homeowner can cancel the captain appointment at any time and regain the control right over toys.

Figure 5:
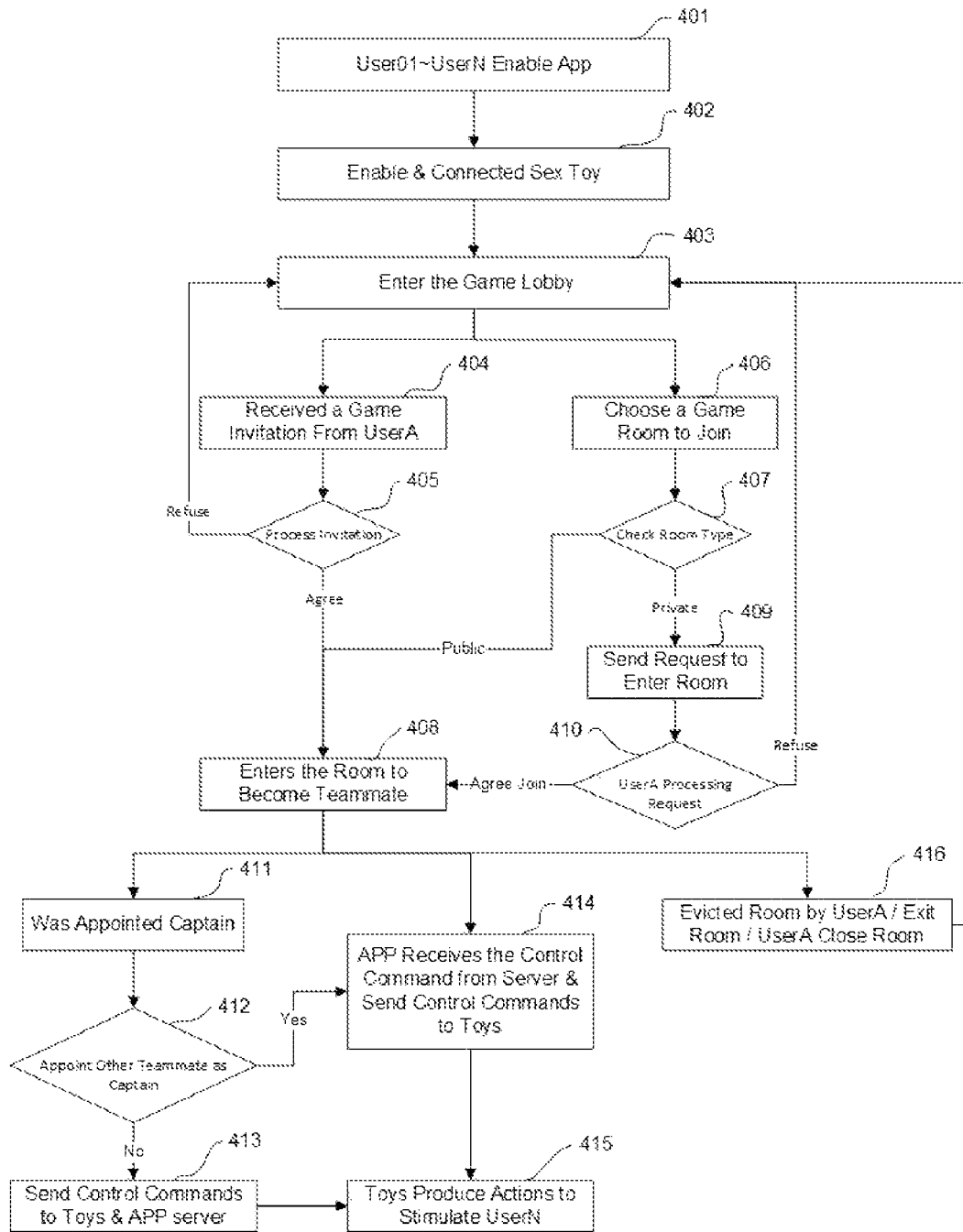
FIG. 5 is the flow diagram of the room teammates in the mutually-controlled interaction system of sex toys between a plurality of users by creating a game room through the APP.

FIG. 5 shows another technical scheme of the present invention, i.e., another mode of the game room. Similarly, the system of this present invention comprises: a plurality of users, in which, a plurality of users have their own operable sex toys that can be configured to receive signals respectively and wireless mobile devices connected to the sex toys in the same internet; the same network refers to Bluetooth/WiFi connection. The wireless mobile device of this invention is provided with an APP for connecting sex toys. The system also comprises a server used for storing data of different users and handling different user data requests; and a plurality of users that are connected to the internet and then are connected to the server to obtain data through the wireless mobile device. Based on this premise, another operation method of the game room includes the following steps:

S401 A plurality of users enable their own APPs in the wireless mobile devices that control the sex toys respectively;

S402 A plurality of users enable their own sex toys and connect the APPs to the sex toys in a wireless manner in the same network respectively;

S403 A plurality of users enter the game lobby through the APPs respectively;

S404 A plurality of users find their own entry invitation to a public game room or a private game room that has been created by the homeowner in the game lobby respectively;

S405 A plurality of users handle their own entry invitations respectively;

S408 After the user agrees to join, the users enter the invited public game room or the private game room;

S411 One of the plurality of users in the game room is appointed as the captain by the homeowner or as a new captain by the existing captain and become the controller to obtain the control right over toys;

S412 The user being appointed as the controller can select to appoint another user as the captain and hand over the control right over toys;

S413 The captain operates the APP virtual control panel mounted on the wireless device and sends the control commands to the toy; synchronously, the APP relays the control commands to the APPs of all teammates except for the captain and of the homeowner in the room;

S414 The APPs of the plurality of users except for the APP of the captain receive control commands from the server and relay the control commands to their toys respectively;

S415 The toys of the plurality of users produce the corresponding actions to stimulate the users based on the received control commands;

S416 The user returns to the game lobby after being evicted out of the game room by the homeowner, or the homeowner closes the game room, or the user exits the game room by its own.

It should be noted that the method also includes the following steps:

S406 The plurality of users can choose to enter the existing public game room or private game room in the game lobby respectively;

S407 After the plurality of users choose the game room, the system will automatically identify the property of selected game room. If the game room property is public, any user can directly enter the game room and become the teammate;

S409 If the game room property is private, the user needs to send a request to enter the game room;

S410 The homeowner handles the request to join sent by the user. If the homeowner agrees the user to join, the user will enter the game room and become a teammate; if the homeowner rejects the user to join, the user can only select another game room in the game lobby.

Figure 6:
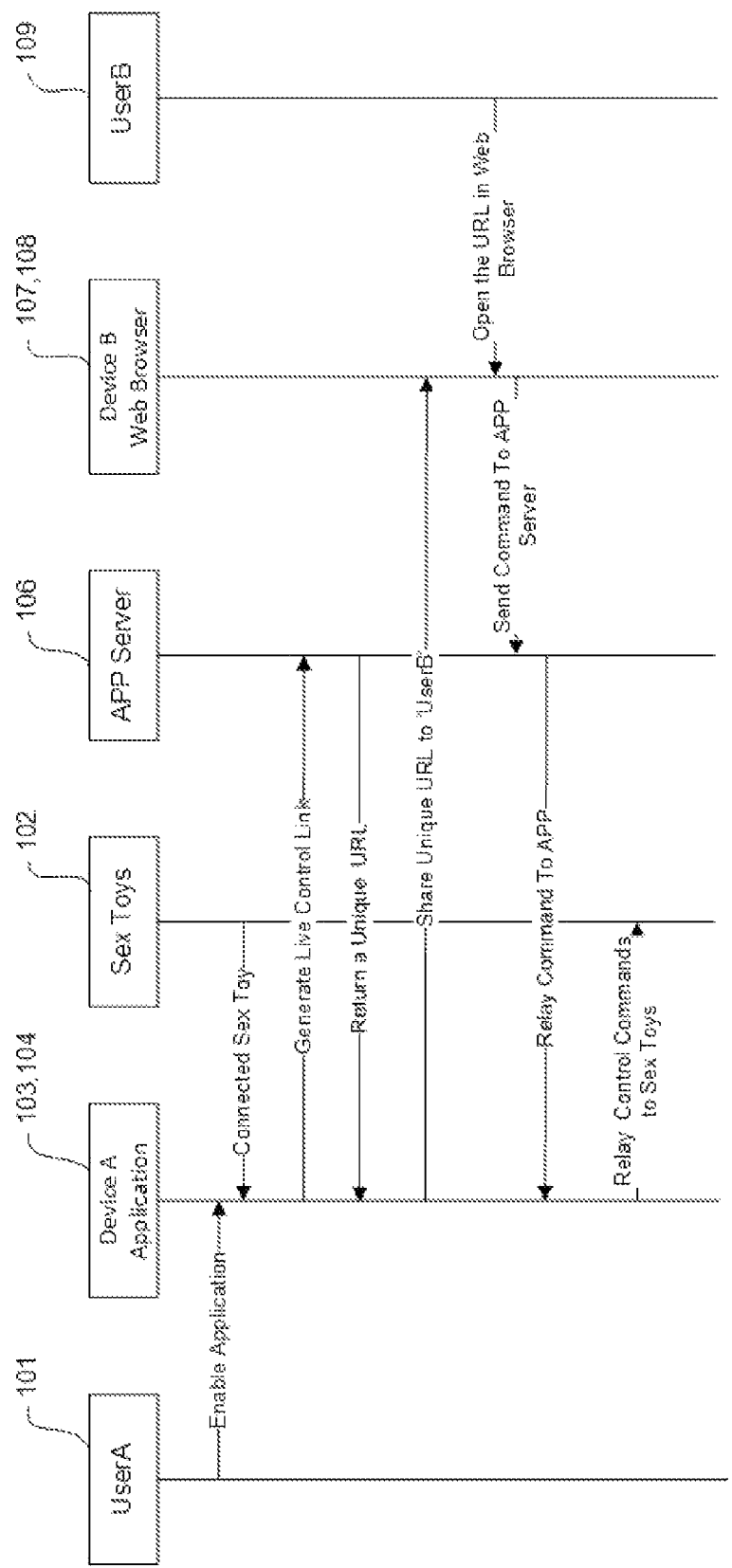
FIG. 6 is the schematic diagram that shows the interaction between objects in the system with sex toys controlled by the remote control link.
Figure 7:
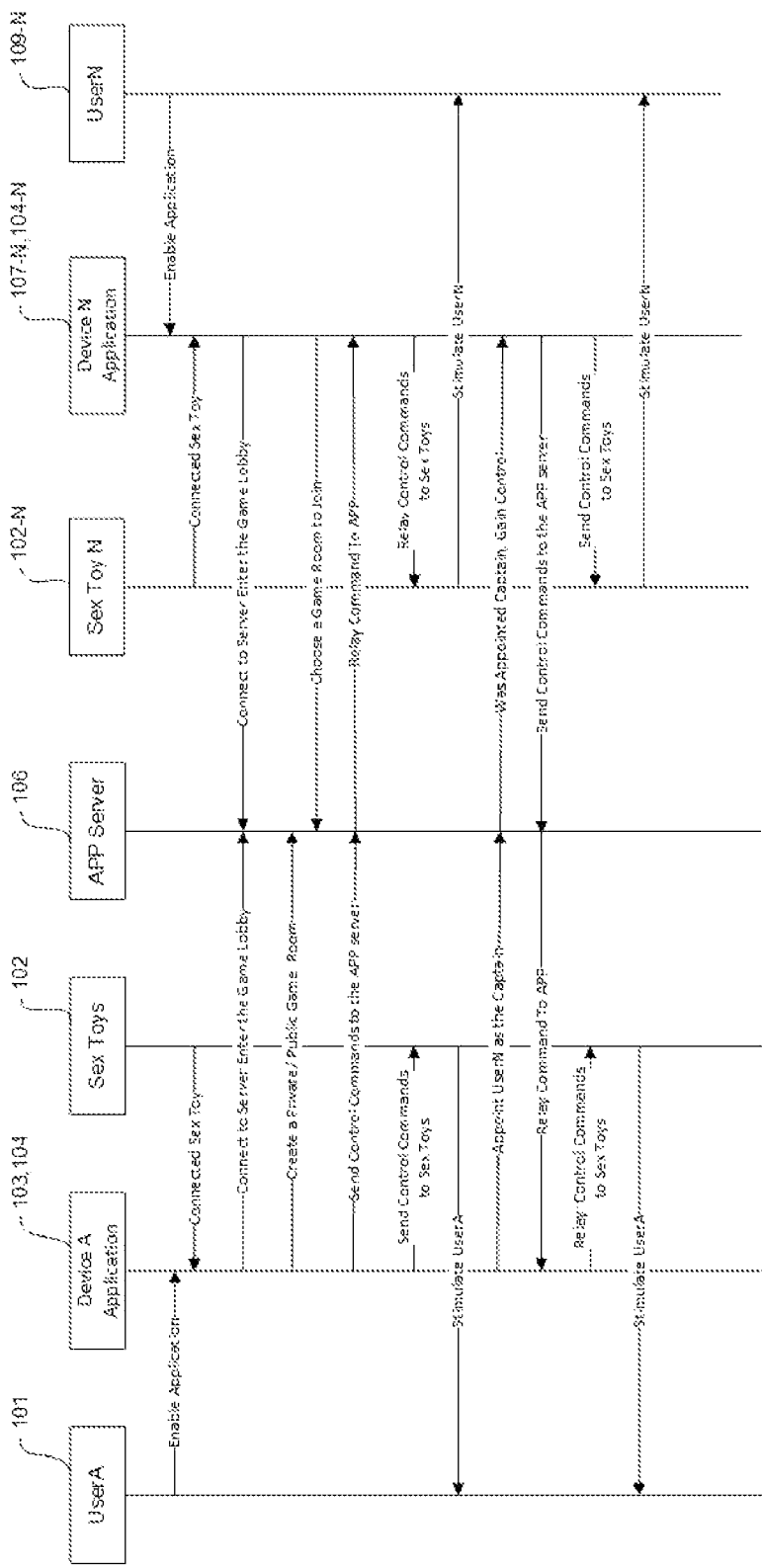
FIG. 7 is the schematic diagram that shows the interaction between objects in the mutually-controlled interaction system of sex toys between a plurality of users by creating a game room through the APP.

FIG. 6 illustrates the interaction flow between the user A 101, the sex toy, the wireless mobile device and the APP with the user B 109 through this invention;

FIG. 7 illustrates the interaction flow between the user 101 and the users 109-N through this invention when a plurality of users have their own sex toys.

It will be understood by those skilled in the art that various changes and modifications may be made according to the above technical scheme and conception, and all these changes and modifications should fall within the scope of protection of the claims of this invention.

What is claimed is:

1. An internet-based remote interactive system for sex toys, the system comprises a server used for storing data of different users and handling different user data requests; a sex toy configured to receive signals, in which, the sex toy is configured to produce actions based on the received signals; a wireless mobile device with an APP for sending signals to the sex toy in which, the APP sends signals to the sex toy to control the sex toy action based on the control commands from the server; when user-to-user interaction exists, the system also comprises a user A, in which, the user A has an operable sex toy configured to receive signals and a wireless mobile device A connected to the sex toy in the same internet; the user A is connected to the internet and then is connected to the server to obtain data through the wireless mobile device; and a user B, in which, the user B has a wireless mobile device B connected to the server through the internet; the user B sends control commands to the server through the control link shared by the user A; after receiving the control commands, the sex toy produces the actions corresponding to the control commands, and the action implementing object is the user A, wherein the user B opens the control link, in which, the user A obtains a remote control link from the server through the APP, and send the link to the user B through third-party communication software; after the user B receives the remote control link and opens the corresponding URL through the web browser, the URL generates a virtual control panel; the user B sends control commands to the server by operating the virtual control panel; the server relays the control commands to the APP of the user A; the APP sends the control commands to the sex toy based on the control commands received from the server; and the sex toy produces the corresponding actions.

2. The internet-based remote interactive system for sex toys according to claim 1, wherein: the sex toy is connected to the APP through the Bluetooth or WiFi, the sex toy produces the corresponding actions by receiving the control commands from the APP, and the APP sends the control commands to the sex toy based on the control commands received from the server.

3. The internet-based remote interactive system for sex toys according to claim 2, wherein, the APP includes a game lobby subprogram, in which, the subprogram allows the user to create a game room or enter an existing game room; the user creating the game room is called a homeowner, and other users in the game room are teammates.

4. The internet-based remote interactive system for sex toys according to claim 3, wherein, the game room is one of public or private; when the game room is public, any user in the game lobby can enter the room; when the game room is private, if a user in the game lobby wants to enter the game room, the user needs to send a request to the homeowner and only enter the room after obtaining the consent of the homeowner; and the homeowner sends a game invitation to a designated user in the game lobby; after the user agrees to join, the user automatically enter the homeowner room.

5. The internet-based remote interactive system for sex toys according to claim 1, wherein, the homeowner sends control commands to an APP-connected sex toy and control the sex toy to produce the corresponding actions; at the same time, the APP relays the control commands to the APPs of other teammates in the room though the server; after receiving the control commands relayed by the server, the teammate APPs send the control commands to the corresponding APP-connected sex toys and control the toys to produce the corresponding actions.

6. The internet-based remote interactive system for sex toys according to claim 5, wherein, the homeowner appoints one captain among teammates as the controller; the captain replaces the homeowner to control the sex toys of all members in the room including the homeowner to produce the corresponding actions; the homeowner cancels the captain appointment at any time or re-appoint a captain; the captain also hand over the control right to another teammate, and the teammate that takes over the control right becomes the new captain.

\* \* \* \* \*